(12) United States Patent
Karczewicz et al.

(10) Patent No.: US 11,134,258 B2
(45) Date of Patent: Sep. 28, 2021

(54) PREDICTIVE COEFFICIENT CODING

(71) Applicant: QUALCOMM Incorporated, San Diego, CA (US)

(72) Inventors: Marta Karczewicz, San Diego, CA (US); Hilmi Enes Egilmez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/786,792

(22) Filed: Feb. 10, 2020

(65) Prior Publication Data

US 2020/0260098 A1 Aug. 13, 2020

Related U.S. Application Data

(60) Provisional application No. 62/804,064, filed on Feb. 11, 2019.

(51) Int. Cl.
*H04N 19/44* (2014.01)
*H04N 19/50* (2014.01)
*H04N 19/645* (2014.01)

(52) U.S. Cl.
CPC .......... *H04N 19/50* (2014.11); *H04N 19/44* (2014.11); *H04N 19/645* (2014.11)

(58) Field of Classification Search
CPC ........ H04N 19/18; H04N 19/44; H04N 19/50; H04N 19/82; H04N 19/103; H04N 19/105; H04N 19/176; H04N 19/182
See application file for complete search history.

(56) References Cited

U.S. PATENT DOCUMENTS

| 9,558,567 | B2 | 1/2017 | Guo et al. |
| 9,654,777 | B2 | 5/2017 | Guo et al. |
| 2014/0301474 | A1 | 10/2014 | Guo et al. |
| 2016/0227226 | A1* | 8/2016 | Rapaka ................ H04N 19/182 |
| 2020/0128266 | A1* | 4/2020 | Xu ....................... H04N 19/105 |

OTHER PUBLICATIONS

Bross B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11, JVET-M0464-v4, 13th Meeting, Jan. 9-18, 2019, 13 Pages.

(Continued)

*Primary Examiner* — Tsion B Owens
(74) *Attorney, Agent, or Firm* — Shumaker & Sieffert, P.A.

(57) ABSTRACT

A video decoder configured to determine a residual block by, for a first coefficient of a coefficient group, receiving a first instance of a flag, wherein the first instance of the flag is set to a first value; in response to the first instance of the flag being set to the first value, copying a coefficient value of a neighboring coefficient for the first coefficient; for a second coefficient of the coefficient group, receiving a second instance of the flag, wherein the second instance of the flag is set to a second value; in response to the second instance of the flag being set to the second value, receiving an index; determining, from a list of coefficient values, a value corresponding to the index; and set a value for the second coefficient to the value corresponding to the index.

44 Claims, 10 Drawing Sheets

(56) References Cited

OTHER PUBLICATIONS

Bross B., et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 Pages.
Bross B., et al., "Versatile Video Coding (Draft 8)," Joint Video Experts Team (JVET) of ITU-T SG 16 WP 3 and ISO/IEC JTC 1/SC 29/WG 11,17th Meeting: Brussels, BE, Jan. 7-17, 2020, Document: JVET-Q2001-vA, 519 Pages.
Chen J., et al., "Algorithm Description for Versatile Video Coding and Test Model 3 (VTM 3)," 12, JVET Meeting, Oct. 3, 2018-Oct. 12, 2018, Macao, (The Joint Video Exploration Team of ISO/IEC JTC1/SC29/WG11 and ITU-T SG.16, JVET-L1002, Dec. 3, 2018 (Dec. 3, 2018), XP030198628, 38 pages, Retrieved from the Internet: URL: http://phenix.int-evry.fr/jvet/doc_end_user/documents/12_Macao/wg11/JVET-L1002-v1.zip JVET-L1002-v1.docx [retrieved on Dec. 3, 2018], paragraph [3.2.5], paragraph [3.9.1].
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 Pages.
Ergen S., "ZigBee/IEEE 802.15.4 Summary," Sep. 10, 2004, 37 Pages.
Guo L., et al., "Color Palette for Screen Content Coding," 2014 IEEE International Conference on Image Processing (ICIP), Oct. 1, 2014 (Oct. 1, 2014), XP055179887, pp. 5556-5560, DOI:10.1109/ICIP.2014.7026124, ISBN: 978-1-47-995751-4, abstract section "2 Palette coding."

IEEE Std 802.11ad-2012: "Part 11: Wireless LAN Medium Access Control (MAC) and Physical Layer (PHY) Specifications—Amendment 3: Enhancements for Very High Throughput in the 60 GHz Band," LAN/MAN Standards Committee of the IEEE Computer Society, Dec. 28, 2012, 628 Pages.
International Search Report and Written Opinion—PCT/US2020/017693—ISA/EPO—dated Apr. 14, 2020, 16 Pages.
ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
Sun Y-C., et al., "CE1-Related: Harmonization Between JCTVC-T0065 Non CE1: Grouping Palette Indices At Front and CE1 Test A.1.5," 20. JCT-VC Meeting, Feb. 10, 2015-Feb. 18, 2015, Geneva; (Joint Collaborative Team on Video Coding of ISO/IEC JTC1/SC29/WG11 and ITU-T SG.16 WP3); URL: http://wftp3.itu.int/av-arch/jctvc-site/, No. JCTVC-T0233, Feb. 18, 2015, XP030117406, pp. 1-7.
Zou F., et al., "Non-RCE4: Joint proposal of JCTVC-P0231 and JCTVC-P0119: Palette with Limit Run and Palette Predictor," 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0239, Jan. 11, 2014 (Jan. 11, 2014), XP030115784, pp. 1-4, section "1 Introduction" section 2 Method Decscription (JCTVC-P0231).
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

* cited by examiner

PREDICTIVE COEFFICIENT CODING

This application claims the benefit of U.S. Provisional Application 62/804,064, filed 11 Feb. 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes predictive coefficient coding techniques, where a coefficient can be coded by copying a neighboring coefficient or selecting a coefficient from a predefined list (e.g., a dictionary) of coefficient values. These techniques can be used to achieve better coefficient coding, particularly for screen content or residual blocks that are coded without transformation, such as for residual blocks coded in a transform skip mode. When coding a residual block in a transform skip mode, the coefficients of the block are not transformed, which usually results in a block having relatively more non-zero coefficients. Various techniques exist for efficiently coding blocks of transform coefficients, but those coding techniques are predicated on an assumption that a large number of the transform coefficients will be equal to zero or sometimes one. Accordingly, those techniques do not necessarily work well for non-transformed blocks with few coefficients equal to zero. This disclosure describes techniques that may improve the coding efficiency when coding residual blocks with few zero coefficients.

According to one example, a method of decoding video data includes determining a predictive block for a current block of the video data; determining a residual block for the current block, wherein determining the residual block for the current block comprises: for a first coefficient of a coefficient group, receiving a first instance of a flag, wherein the first instance of the flag is set to a first value; in response to the first instance of the flag being set to the first value, copying a coefficient value of a neighboring coefficient for the first coefficient; for a second coefficient of the coefficient group, receiving a second instance of the flag, wherein the second instance of the flag is set to a second value; in response to the second instance of the flag being set to the second value, receiving an index into a list of coefficient values; determining, from the list of coefficient values, a value corresponding to the index; and setting a value for the second coefficient to the value corresponding to the index; and adding the predictive block to the residual block to determine a reconstructed block for the current block.

According to another example, a device for decoding video data includes a memory configured to store video data and one or more processors implemented in circuitry and configured to determine a predictive block for a current block of the video data; determine a residual block for the current block, wherein to determine the residual block for the current block, the one or more processors are further configured to: for a first coefficient of a coefficient group, receive a first instance of a flag, wherein the first instance of the flag is set to a first value; in response to the first instance of the flag being set to the first value, copy a coefficient value of a neighboring coefficient for the first coefficient; for a second coefficient of the coefficient group, receive a second instance of the flag, wherein the second instance of the flag is set to a second value; in response to the second instance of the flag being set to the second value, receive an index into a list of coefficient values; determine, from the list of coefficient values, a value corresponding to the index; and set a value for the second coefficient to the value corresponding to the index; and add the predictive block to the residual block to determine a reconstructed block for the current block.

According to another example, a computer-readable medium storing instructions that when executed by one or more processors cause the one or more processors to determine a predictive block for a current block of video data; determine a residual block for the current block, wherein to determine the residual block for the current block, the instructions cause the one or more processors to for a first coefficient of a coefficient group, receive a first instance of a flag, wherein the first instance of the flag is set to a first value; in response to the first instance of the flag being set to the first value, copy a coefficient value of a neighboring coefficient for the first coefficient; for a second coefficient of the coefficient group, receive a second instance of the flag, wherein the second instance of the flag is set to a second value; in response to the second instance of the flag being set to the second value, receive an index into a list of coefficient values; determine, from the list of coefficient values, a value corresponding to the index; and set a value for the second coefficient to the value corresponding to the index; and add the predictive block to the residual block to determine a reconstructed block for the current block.

According to another example, an apparatus includes means for determining a predictive block for a current block of video data; means for determining a residual block for the current block, wherein the means for determining the residual block for the current block comprises means for receiving a first instance of a flag for a first coefficient of a coefficient group, wherein the first instance of the flag is set to a first value; means for copying a coefficient value of a neighboring coefficient for the first coefficient in response to the first instance of the flag being set to the first value; means for receiving a second instance of the flag for a second coefficient of the coefficient group, wherein the second instance of the flag is set to a second value; means for receiving an index in response to the second instance of the flag being set to the second value into a list of coefficient values; means for determining, from the list of coefficient values, a value corresponding to the index; means for setting a value for the second coefficient to the value corresponding to the index; means for adding the predictive block to the residual block to determine a reconstructed block for the current block.

The details of one or more examples are set forth in the accompanying drawings and the description below. Other features, objects, and advantages will be apparent from the description, drawings, and claims.

DETAILED DESCRIPTION

Figure 1:
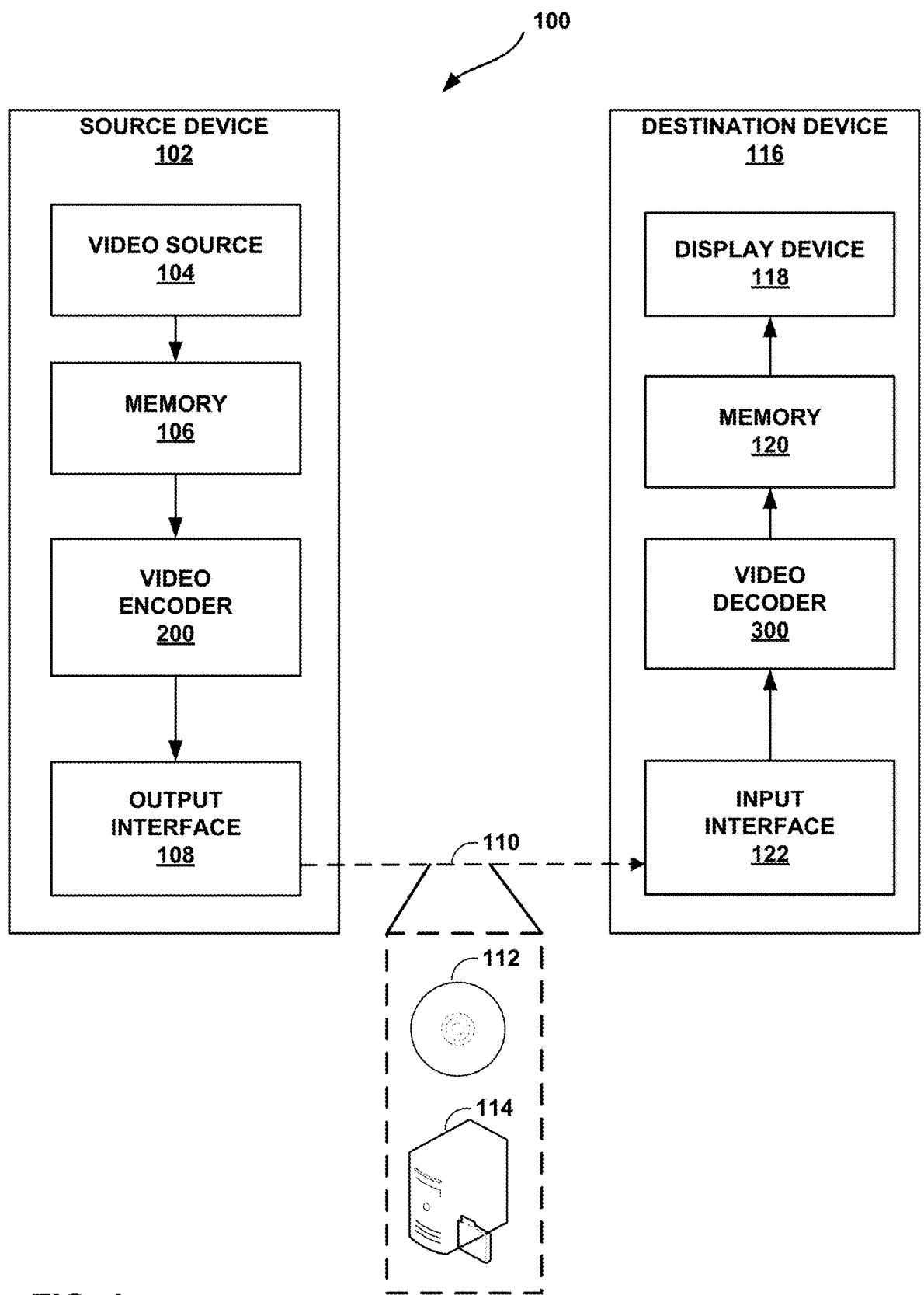
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the predictive block, also referred to as a prediction block, to the original block. Thus, the residual data represents a difference between the predictive block and the original block of video data. In some coding scenarios, to reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the predictive block to produce a reconstructed video block that matches the original video block more closely than the predictive block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder may perform one or more filtering operations on the reconstructed video blocks. As part of performing one or more filtering operations, the video decoder may, for example, perform one or more of deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes predictive coefficient coding techniques, where a coefficient can be coded by copying a neighboring coefficient or selecting a coefficient from a predefined list (e.g., a dictionary) of coefficient values. These techniques can be used to achieve better coefficient coding, particularly for screen content or residual blocks that are coded without transformation, such as for residual blocks coded in a transform skip mode. When coding a residual block in a transform skip mode, the coefficients of the block are not transformed, which usually results in a block having relatively more non-zero coefficients. Various techniques exist for efficiently coding blocks of transform coefficients, but those coding techniques are predicated on an assumption that a large number of the transform coefficients will be equal to zero or sometimes one. Accordingly, those techniques do not necessarily work well for non-transformed blocks with few coefficients equal to zero. This disclosure describes techniques that may improve the coding efficiency when coding residual blocks with few zero coefficients.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may each comprise any of a wide range of devices, including desktop computer, notebook (i.e., laptop) computer, tablet computer, set-top box, broadcast receiver device, telephone handset such as a smartphone, television, camera, display device, digital media player, video gaming console, video streaming device, mobile device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coefficient coding described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques for coefficient coding described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection, or the like. This may include a wireless channel (e.g., a Wi-Fi connection or a different connection according to a wireless communication standard), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters, receivers, transceivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively or additionally, video encoder 200 and video decoder 300 may operate according to other proprietary or industry standards, such as the Joint Exploration Test Model (JEM) or Versatile Video Coding (VVC). An early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)." Another recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vA (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block (also called a predictive block) for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block (i.e., predictive block) for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

Although the above describes examples where transforms are preformed, in some examples, the transform may be skipped. For instance, video encoder 200 may implement transform skip mode in which the transform operation is skipped. In examples where transform is skipped, video encoder 200 may output coefficients corresponding to residual values instead of transform coefficients. In the following description, the term "coefficient" should be interpreted to include either coefficients corresponding to residual values or transform coefficients generated from the result of a transform.

As noted above, following any transforms or where transform is skipped to produce coefficients, video encoder 200 may perform quantization of the coefficients. In some examples, quantization may also be skipped when transform is skipped. Quantization generally refers to a process in which coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the coefficients (e.g., generated from the result of the transform or due to transform skip), producing a one-dimensional vector from the two-dimensional matrix including the quantized coefficients. The scan may be designed to place higher energy (and therefore lower frequency) coefficients at the front of the vector and to place lower energy (and therefore higher frequency) coefficients at the back of the vector. In examples where transform is skipped, the result of the scan may not be that higher energy coefficients are at the front of the vector and lower energy coefficients are at the back of the vector. In some examples, video encoder 200 may utilize a predefined scan order to scan the quantized coefficients to produce a serialized vector, and then entropy encode the quantized coefficients of the vector. In other examples, video encoder 200 may perform an adaptive scan. After scanning the quantized coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

As introduced above, video encoder 200 encodes residual data in TUs. Depending on the expected characteristics of the residual data in a TU, video encoder 200 may encode TUs in different modes, such as a transform mode or a transform skip mode, with different modes utilizing different coefficient coding schemes. Some coefficient coding schemes utilize coefficient groups to encode a TU. A coefficient group generally is a subset of the coefficients in a TU. For example, video encoder 200 may encode a 16×16 TU as four 4×4 coefficient groups.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs and the partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized coefficients that represent either residual values or transform coefficients. Video decoder 300 may inverse quantize and inverse transform the quantized transform coefficients of a block to reproduce a residual block for the block. In examples where video encoder 200 skipped the transform operation (e.g., transform skip mode), video decoder 300 may skip the inverse transform operation. Video decoder 300 uses a signaled prediction mode (intra- or inter-prediction) and related prediction information (e.g., motion information for inter-prediction) to form a prediction block (i.e., predictive block) for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, video encoder 200 may signal the coefficients, which may be quantized. The coefficients may be the result of a transform operation or where transform is skipped. In some examples, two neighboring coefficients may have the same value. Therefore, rather than signaling the coefficient values for the two neighboring coefficients, coding efficiency may be realized by video encoder 200 indicating to video decoder 300 to copy the coefficient value of a neighboring block. Specifically, such a technique may improve the coding efficiency for residual blocks that have certain characteristics, such as lots of coefficients that are similar in value but not equal to zero.

Moreover, even if a coefficient value is not the same as a coefficient value of a neighboring coefficient, there may be possibilities for gains in coding efficiency. For example, video encoder 200 and video decoder 300 may each maintain a list of coefficient values. In some examples, rather than signaling the actual coefficient value, video encoder 200 may signal an index into the list of coefficient values. Video decoder 300 may determine the coefficient value based on the index into the list of coefficient values. Video encoder 200 and video decoder 300 may be configured to add values for copied neighboring blocks to the list, such that the list includes coefficient values with a high probability corresponding to the values for coefficients being coded.

In some examples, the list of coefficient values may be fixed, but in other examples, the list of coefficient values may be modified or adaptive. For instance, there is a possibility that a particular coefficient value for a coefficient is not present in the list of coefficient values. In such examples, video encoder 200 may signal an index that corresponds to an "escape code." In response to receiving such an "escape code," video decoder 300 may determine that the coefficient value for the coefficient is unavailable in the list of coefficient values. Video decoder 300 may then receive the coefficient value for the coefficient, and in some examples, update the list of coefficient values to include the newly received coefficient value. As part of updating the list, video decoder 300 may add the coefficient value for the coefficient to a position in the list with an associated index.

There may be various ways in which video encoder 200 can indicate to video decoder 300 whether to utilize a coefficient value of a neighboring coefficient or whether to utilize a coefficient value from the list of coefficient values. As one example, video encoder 200 may signal a flag having a first value and a second value for a coefficient. If the flag has the first value, then video decoder 300 may determine that a coefficient value of a neighboring coefficient is to be used, and if the flag has the second value, then video decoder 300 may determine that a coefficient value from the list of coefficient values is to be used.

Figure 2A:
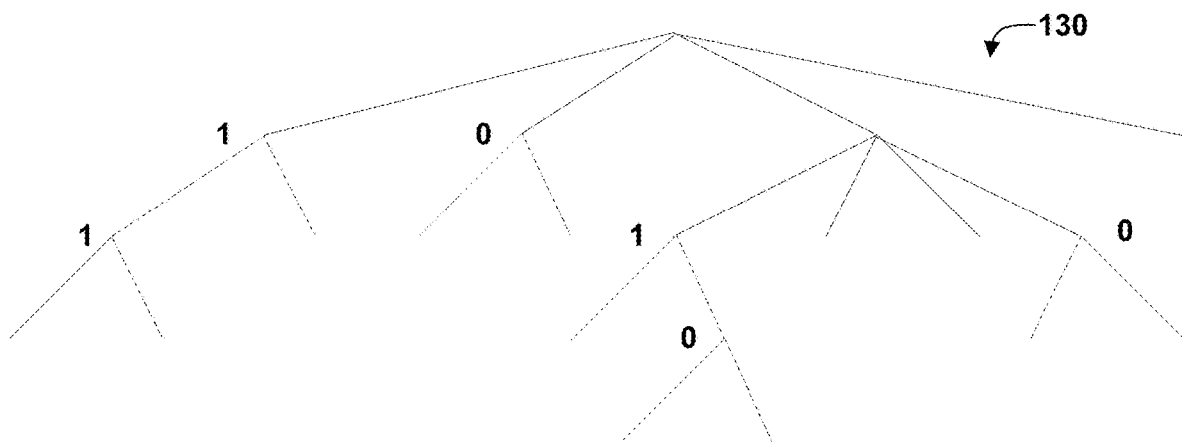
FIGS. 2A and 2B are conceptual diagrams illustrating an example quadtree binary tree (QTBT) structure, and a corresponding coding tree unit (CTU).
Figure 2B:
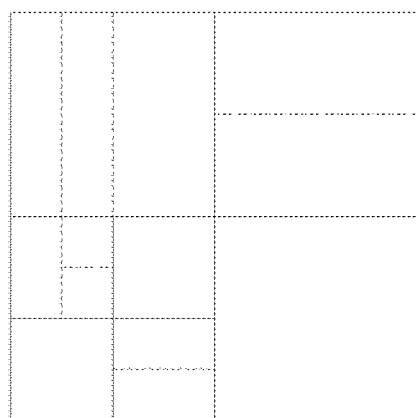

FIGS. 2A and 2B are conceptual diagrams illustrating an example quadtree binary tree (QTBT) structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level (e.g., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (Min QTSize, representing a minimum allowed quadtree leaf node size), a maximum binary tree size (Max BTSize, representing a maximum allowed binary tree root node size), a maximum binary tree depth (Max BTDepth, representing a maximum allowed binary tree depth), and a minimum binary tree size (Min BTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (Max BTSize), then the nodes can be further partitioned by respective binary trees. The binary tree splitting of one node can be iterated until the nodes resulting from the split reach the minimum allowed binary tree leaf node size (Min BTSize) or the maximum allowed binary tree depth (Max BTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the Min QTSize is set as 16×16, the Max BTSize is set as 64×64, the Min BTSize (for both width and height) is set as 4, and the Max BTDepth is set as 4. The quadtree partitioning is applied to the CTU first to generate quad-tree leaf nodes. The quadtree leaf nodes may have a size from 16×16 (i.e., the Min QTSize) to 128×128 (i.e., the CTU size). If the quadtree leaf node is 128×128, the quadtree leaf node will not be further split by the binary tree, because the size exceeds the Max BTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches Max BTDepth (4, in this example), no further splitting is permitted. The binary tree node having a width equal to Min BTSize (4, in this example) implies that no further horizontal splitting is permitted. Similarly, a binary tree node having a height equal to Min BTSize implies that no further vertical splitting is permitted for that binary tree node. As noted above, leaf nodes of the binary tree are referred to as CUs and are further processed according to prediction and transform without further partitioning.

The coefficient coding scheme of VTM 3.0 is optimized for coding scenarios where the coefficients are obtained from the transformation of residual blocks. Transformation usually results in a large number of coefficients being equal to zero or sometimes one. However, JVET-M0464 ("Non-CE8: Unified Transform Type Signalling and Residual Coding for Transform Skip" by Bross et al., January 2019) shows that better coding gains can be achieved by using different coefficient coding techniques for coding scenarios where residual samples are coded without applying a transform, such as when residual samples are coded in a transform skip mode. Skipping the transform process typically results in fewer of the coefficients being equal to zero and/or one. This disclosure describes additional or alternative coefficient coding techniques that may be better suited for coding groups of coefficients that have relatively fewer coefficients equal to zero or one, such as coefficients obtained from residual samples without applying a transform.

According to the techniques of this disclosure, as part of encoding and decoding residual blocks, video encoder 200 and video decoder 300 can be configured to predict coefficients of residual blocks.

Figure 3A:
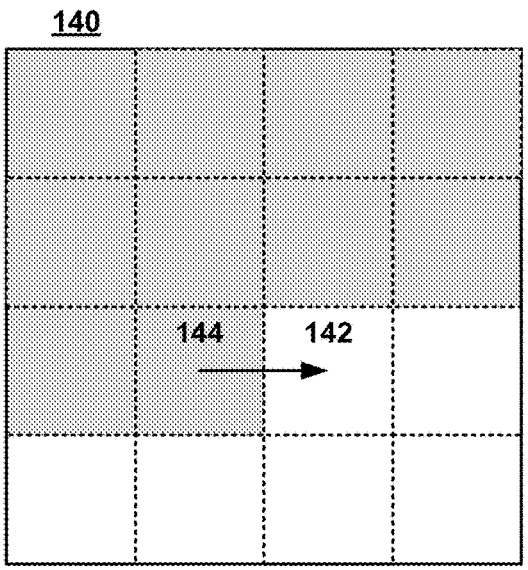
FIG. 3A shows a coefficient being copied from a left neighbor.

FIG. 3A shows a coefficient being copied from a left neighbor. In FIG. 3A, coefficient group 140 is a 4×4 coefficient group. As will be described in more detail below, video encoder 200 and video decoder 300 may determine that the value for coefficient 142 is equal to the value of left neighboring coefficient 144. The shaded squares represent already coded coefficients.

Figure 3B:
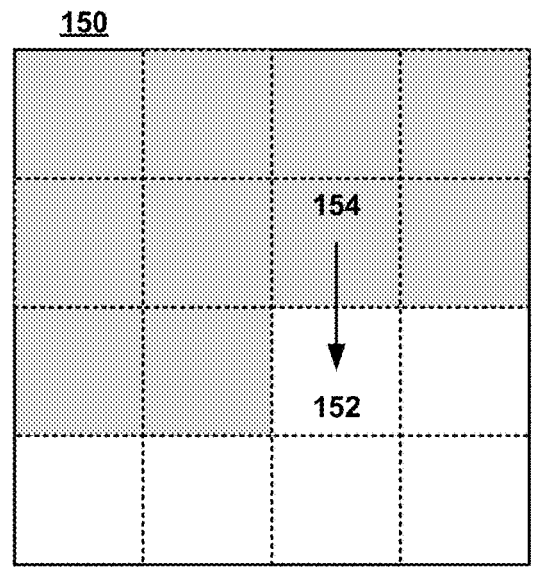
FIG. 3B shows a coefficient being copied from a top neighbor.

FIG. 3B shows a coefficient being copied from a top neighbor. In FIG. 3B, coefficient group 150 is a 4×4 coefficient group. As will be described in more detail below, video encoder 200 and video decoder 300 may determine that the value for coefficient 152 is equal to the value of top neighboring coefficient 154. The shaded squares represent already coded coefficients.

Figure 4A:
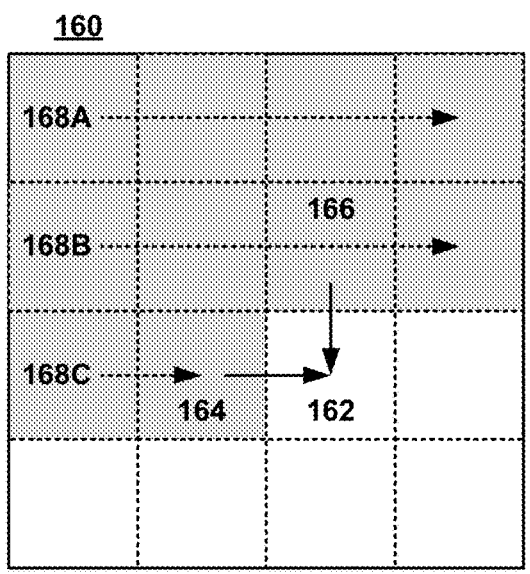
FIG. 4A shows a coefficient being copied from a top neighbor or left neighbor for a raster scan.

FIG. 4A shows a coefficient being copied from a top or left neighbor for a raster scan coefficient group. In FIG. 4A, coefficient group 160 is a 4×4 coefficient group. As will be described in more detail below, video encoder 200 and video decoder 300 may determine that the value for coefficient 162 is equal to the value of left neighboring coefficient 164 or top neighboring coefficient 166. The shaded squares represent already coded coefficients. Arrows 168A-168C represent the scan direction.

Figure 4B:
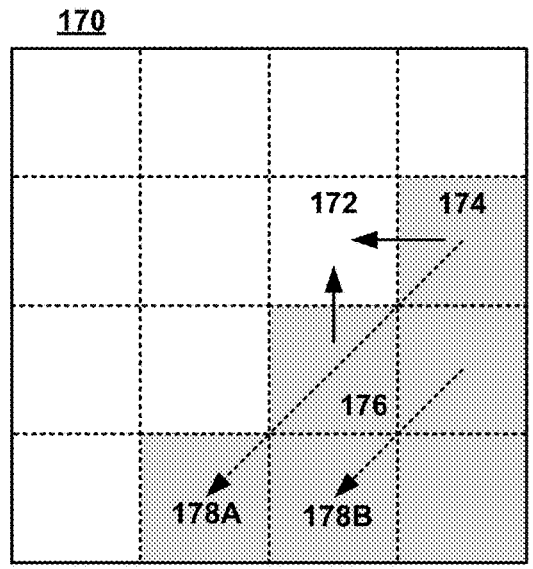
FIG. 4B shows a coefficient being copied from a bottom neighbor or right neighbor for a diagonal scan.

FIG. 4B shows a coefficient being copied from a bottom or right neighbor for a diagonal scan coefficient group. In FIG. 4B, coefficient group 170 is a 4×4 coefficient group. As will be described in more detail below, video encoder 200 and video decoder 300 may determine that the value for coefficient 172 is equal to the value of right neighboring coefficient 174 or bottom neighboring coefficient 176. The shaded squares represent already coded coefficients. Arrows 178A and 178B represent the scan direction.

Figure 5:
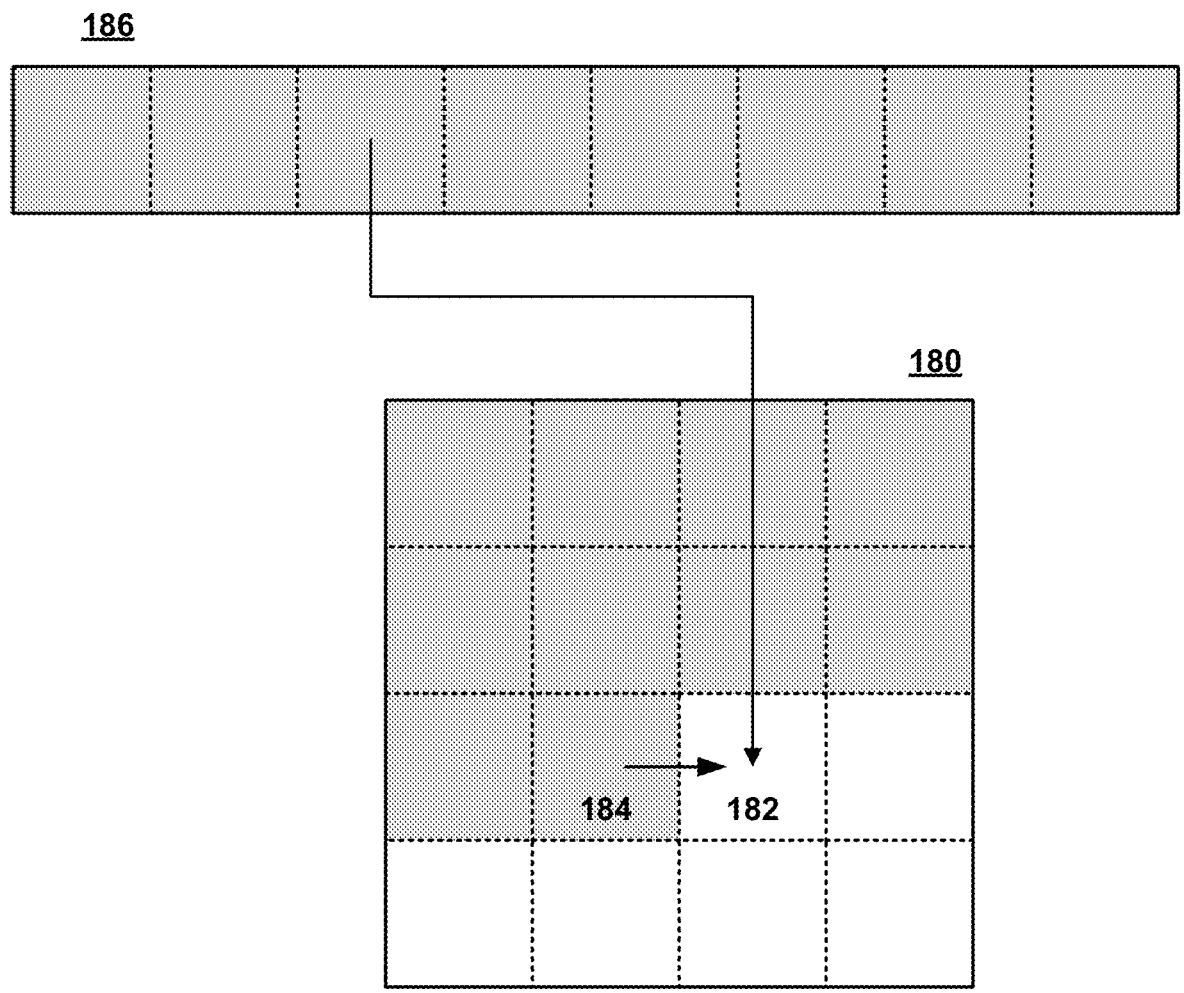
FIG. 5 shows that a coefficient can be predicted from a neighbor and/or list of coefficients.

FIG. 5 shows a coefficient that can be predicted from a neighbor and/or list of coefficients. In FIG. 5, coefficient group 180 is a 4×4 coefficient group. As will be described in more detail below, video encoder 200 and video decoder 300 may determine that the value for coefficient 182 is equal to the value of left neighboring coefficient 184. Video encoder 200 and video decoder 300 may also determine the value for coefficient 182 from list 186, which is a list of coefficient values. The shaded squares in coefficient group 180 represent already coded coefficients, and the shade squares in list 186 represent already-determined values for list 186.

This disclosure describes techniques for predictive coefficient coding. In this context, predictive coefficient coding refers to determining a value for a coefficient based on values for already coded coefficients. The proposed techniques described in the following may be applied individually or any combination of them may be applied.

Video decoder 300 can be configured to predict a coefficient, in a coefficient group or a TU, by copying one of the previously coded coefficients. For example, if the coding order follows a raster scan, video decoder 300 may copy a predictive value for a coefficient from a left or above neighboring coefficient that has previously been coded, as illustrated in FIGS. 3A and 3B. Depending on the coding order (e.g., scan order), the copied coefficient may from a top, left, right, or bottom neighboring coefficient. FIGS. 4A and 4B illustrate two examples with raster and diagonal scans, respectively.

Scans, e.g., a coding order of coefficients, may depend on the intra/inter prediction mode. For example, for TUs using a horizontal prediction mode or a vertical prediction mode, a horizontal scan order or a vertical scan order, respectively, may be employed. The location of the coefficient used for prediction (i.e., copying) may also depend on the intra/inter prediction mode. For example, coefficients in a TU can be copied from left (or top) neighbor if horizontal (or vertical) intra prediction mode is used.

In a coefficient group or TU, video decoder 300 may be configured to predict coefficients from a predefined list of coefficients, as shown in FIG. 5 in addition to predicting coefficients from neighboring coefficients. In this context, predefined means that video decoder 300 defines the list in a specific manner, for a particular coefficient, based on known (e.g., already determined) information prior to decoding that particular coefficient. Video encoder 200, during the video encoding process, may be configured to define the same list in the same manner. As will be explained in more detail below, video encoder 200 and video decoder 300 may be configured to generate the list using one or a combination of fixed entries and dynamically updated entries.

As video encoder 200 and video decoder 300 are configured to generate the same lists, video encoder 200 may signal to video decoder 300 an index value corresponding to the coefficient value in the list that is used for predicting a coefficient. In some examples, the list of coefficients may contain a set of fixed coefficient values that are not updated or removed from the list. For instance, commonly occurring values may be included in the list as fixed coefficient values. In some examples, video decoder 300 may be configured to update the list of coefficients on a per-coefficient basis if a unique coefficient is observed while coding. In this context, a unique coefficient generally refers to a coefficient value that is not already included in the list. In such an instance, video encoder 200 and video decoder 300 may be configured to add the value for the unique coefficient to the list as either an additional entry in the list or as a replacement value for a current entry in the list.

In some instances, video encoder 200 may signal to video decoder 300 an index value corresponding to an escape code. For example, if the list has seven entries, with indexes ranging from 0 to 6, then an index of 7 may signify an escape code. The escape code signifies that the value for a coefficient is not included in the list. Thus, in conjunction with the escape code, video encoder 200 may signal to video decoder 300 additional syntax identifying a value for the coefficient. Video encoder 200 and video decoder 300 may be configured to add the value indicated by the additional syntax to the list as either an additional entry in the list or as a replacement value for a current entry in the list.

Video decoder 300 may be configured to sort the list of coefficients depending on how frequently a coefficient value is copied. Thus, more frequently used coefficient values can be associated with lower indexes, which may enable those indexes to be signaled using fewer bits. For example, video encoder 200 may encode a truncated unary code corresponding to the index, and video decoder 300 may decode the truncated unary code. Video encoder 200 may signal to video decoder 300 a flag to indicate whether the coefficient value is copied from the list or from neighboring coefficients. A combination of neighboring coefficients and coefficients in the list can be used to derive contexts as well as predict coefficients.

In some examples, one or a combination of the above techniques may be used only when transform is skipped (e.g., a transform skip flag is enabled). In some examples, one or a combination of the above techniques may be used for a coefficient group or a TU. In some examples, one or a combination of the above techniques may be used only for intra predicted TUs. In some examples, one or a combination of the above techniques may be used only for inter predicted TUs. In some examples, one or a combination of the above techniques may be used for both intra and inter predicted TUs. In some examples, one or a combination of the above techniques may be used for only one of a luma or a chroma channel (i.e., only for luma blocks of a CU or only for chroma blocks of a CU), while in other examples, one or a combination of the above techniques may be used for both of a luma channel and a chroma channel (i.e., for both luma blocks and chroma blocks).

Figure 6:
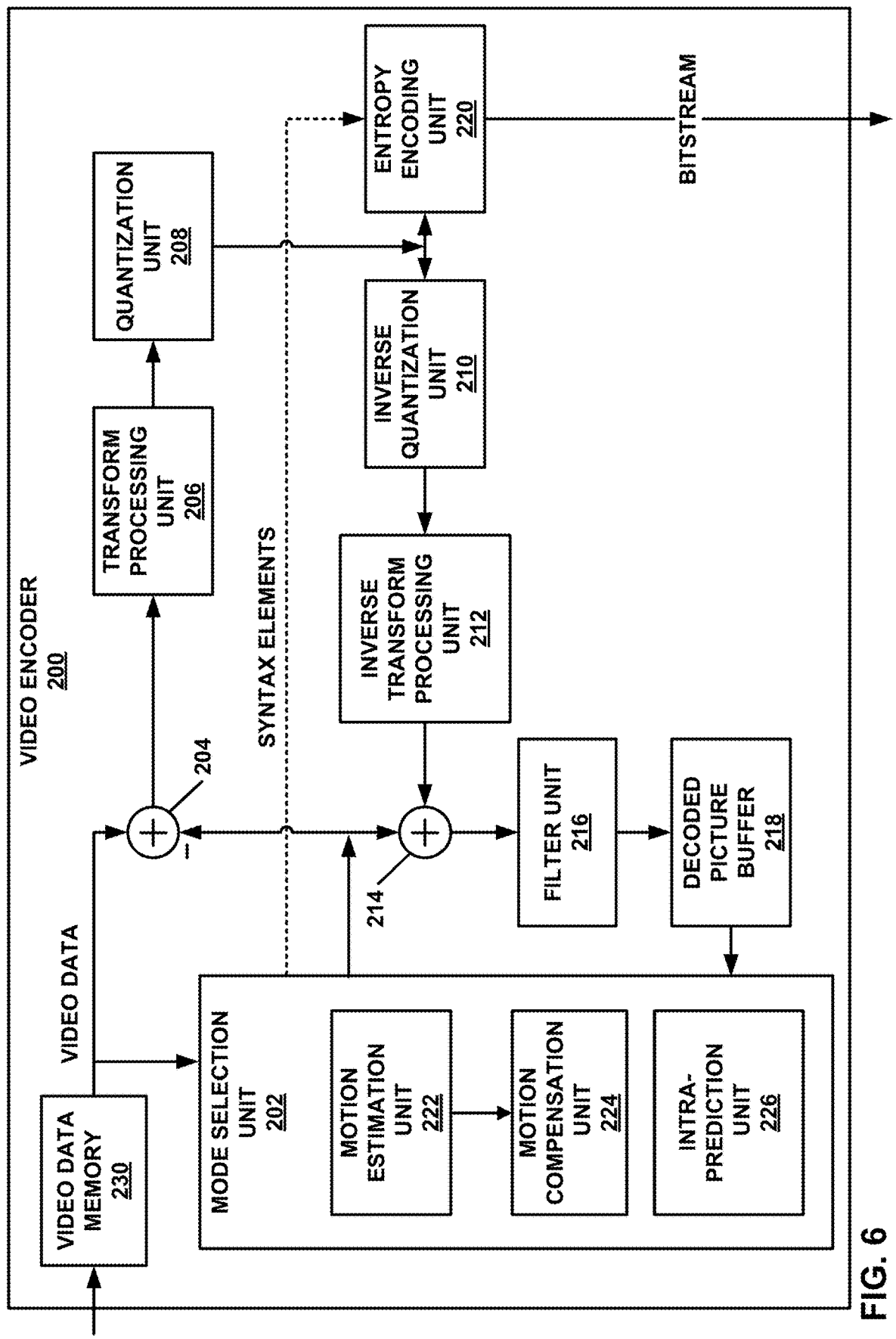
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as DRAM, including SDRAM, MRAM, RRAM, or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. In such instances, transform processing unit 206 may output a block of coefficients, where the coefficients correspond to residual values instead of transform coefficients.

Quantization unit 208 may quantize transform coefficients in a transform coefficient block, to produce a quantized transform coefficient block. For a block coded in transform skip mode, quantization unit 208 may quantize coefficients in a coefficient block to produce a quantized coefficient block. Quantization unit 208 may quantize coefficients or transform coefficients according to a quantization parameter (QP) value associated with the current block. Video encoder 200 (e.g., via mode selection unit 202) may adjust the degree of quantization applied by adjusting the QP value associated with the CU. Quantization may introduce loss of information, and thus, quantized coefficients or transform coefficients may have lower precision than the original coefficients or transform coefficients produced by transform processing unit 206.

Inverse quantization unit 210 and inverse transform processing unit 212 may apply inverse quantization and inverse transforms to a quantized coefficient block, respectively, to reconstruct a residual block from the coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 7:
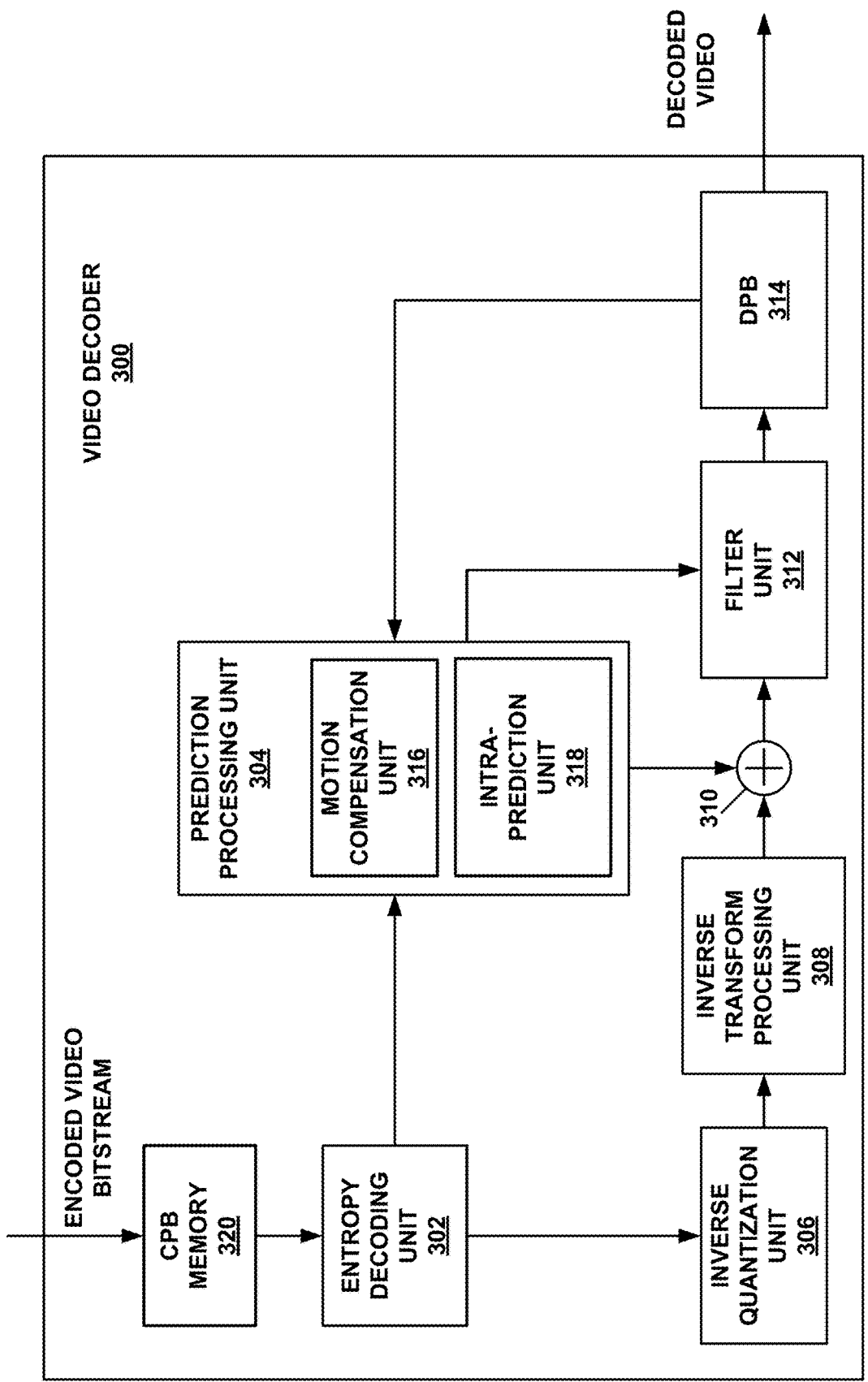
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized coefficients of a quantized coefficient block, as well as transform information, such as a quantization parameter (QP) and/or transform mode indication(s). Inverse quantization unit 306 may use the QP associated with the quantized coefficient block to determine a degree of quantization and, likewise, a degree of inverse quantization for inverse quantization unit 306 to apply. Inverse quantization unit 306 may, for example, perform a bitwise left-shift operation to inverse quantize the transform coefficients. Inverse quantization unit 306 may thereby form a coefficient block including coefficients.

After inverse quantization unit 306 forms the coefficient block for a block that is transformed, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. For blocks that are coded in a transform skip mode, inverse transform processing unit 308 may not perform an inverse transform, and in these coding scenarios, may be viewed as a pass-through unit that does not process or alter block of coefficients.

Furthermore, prediction processing unit 304 generates a prediction block (i.e., predictive block) according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device that includes a memory configured to store video data and one or more processing units implemented in circuitry, with the one or more processing units configured to determine a predictive block for a current block of the video data; determine a residual block for the current block; and add the predictive block to the residual block to determine a reconstructed block for the current block. To determine the residual block for the current block, the one or more processing units of video decoder 300 are further configured to: for a first coefficient of a coefficient group, receive a first instance of a flag, wherein the first instance of the flag is set to a first value; in response to the first instance of the flag being set to the first value, copy a coefficient value of a neighboring coefficient for the first coefficient; for a second coefficient of the coefficient group, receive a second instance of the flag, wherein the second instance of the flag is set to a second value; in response to the second instance of the flag being set to the second value, receive an index; determine, from the list of coefficient values, a value corresponding to the index; and set a value for the second coefficient to the value corresponding to the index.

In this manner, video decoder 300 represents an example of a video decoding device that includes a memory configured to store video data and one or more processing units implemented in circuitry, with the one or more processing units configured to determine a predictive block for a current block of the video data; determine a residual block for the current block of the video data by determining a predicted value for a coefficient of the residual block; and add the predictive block to the residual block to determine a reconstructed block for the current block. The one or more processing units may, for example, determine the residual block in response to determining that the current block is encoded using a transform skip mode.

To determine the residual block for the current block, the one or more processing units are configured to determine a difference value for the coefficient of the residual block and add the difference value for the coefficient of the residual block to the predicted value for the coefficient of the residual block to determine an actual value for the coefficient of the residual block. To determine the predicted value for the coefficient of the residual block, the one or more processing units may copy a value of a neighboring coefficient. To determine the predicted value for the coefficient of the residual block, the one or more processing units may determine a value from a predefined list. To determine the predicted value for the coefficient of the residual block, the one or more processing units may determine a value from a maintained list that is updated based on values of previously decoded coefficients. The one or more processing units may also perform one or more filtering operations on the reconstructed block.

Figure 8:
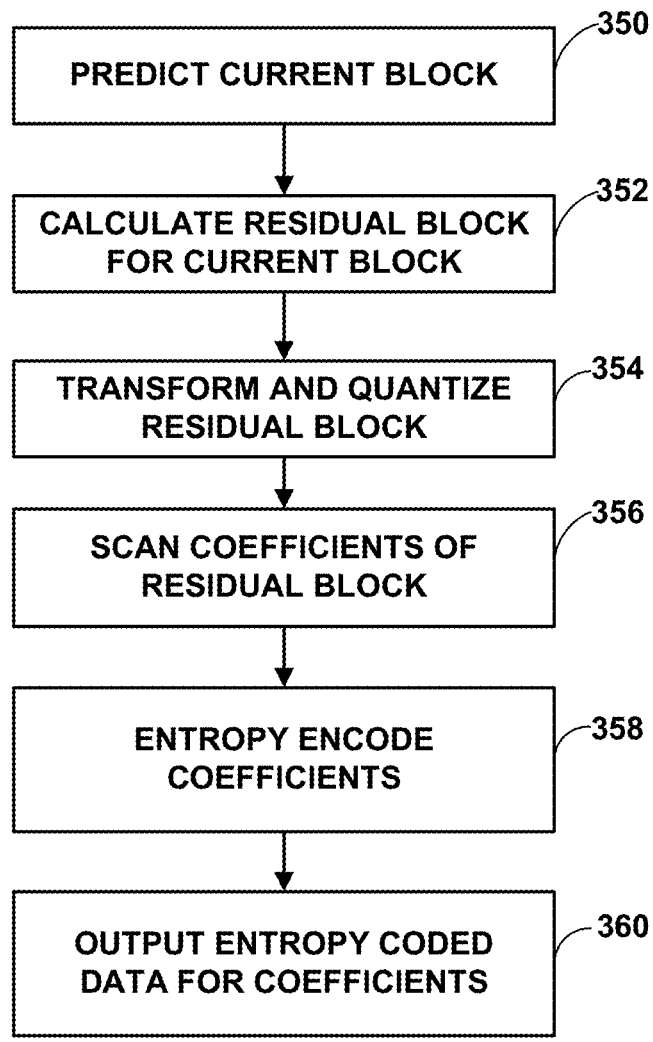
FIG. 8 is a flowchart illustrating a video encoding process.

FIG. 8 is a flowchart illustrating an example process for encoding a current block. The current block may include a current CU. Although described with respect to video encoder 200 (FIGS. 1 and 6), it should be understood that other devices may be configured to perform a process similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform (or skip transform) and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 9:
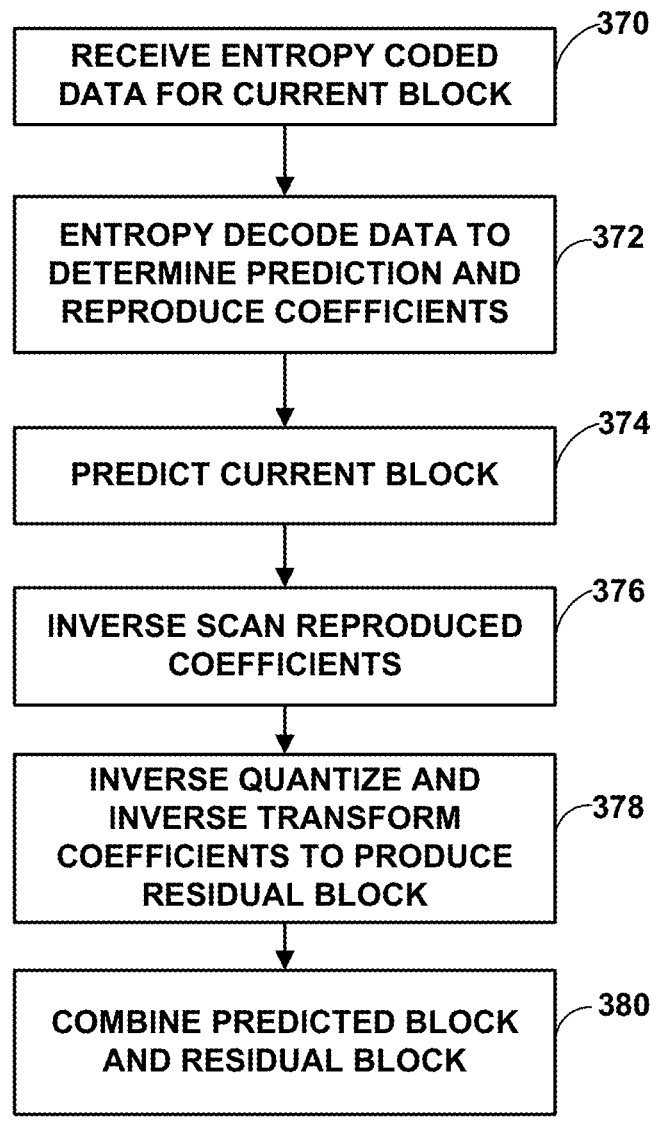
FIG. 9 is a flowchart illustrating a video decoding process.

FIG. 9 is a flowchart illustrating an example process for decoding a current block of video data. The current block may include a current CU. Although described with respect to video decoder 300 (FIGS. 1 and 7), it should be understood that other devices may be configured to perform a process similar to that of FIG. 9.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform (or skip inverse transform) the coefficients to produce a residual block (378). Video decoder 300 may ultimately decode the current block by combining the prediction block and the residual block (380).

Figure 10:
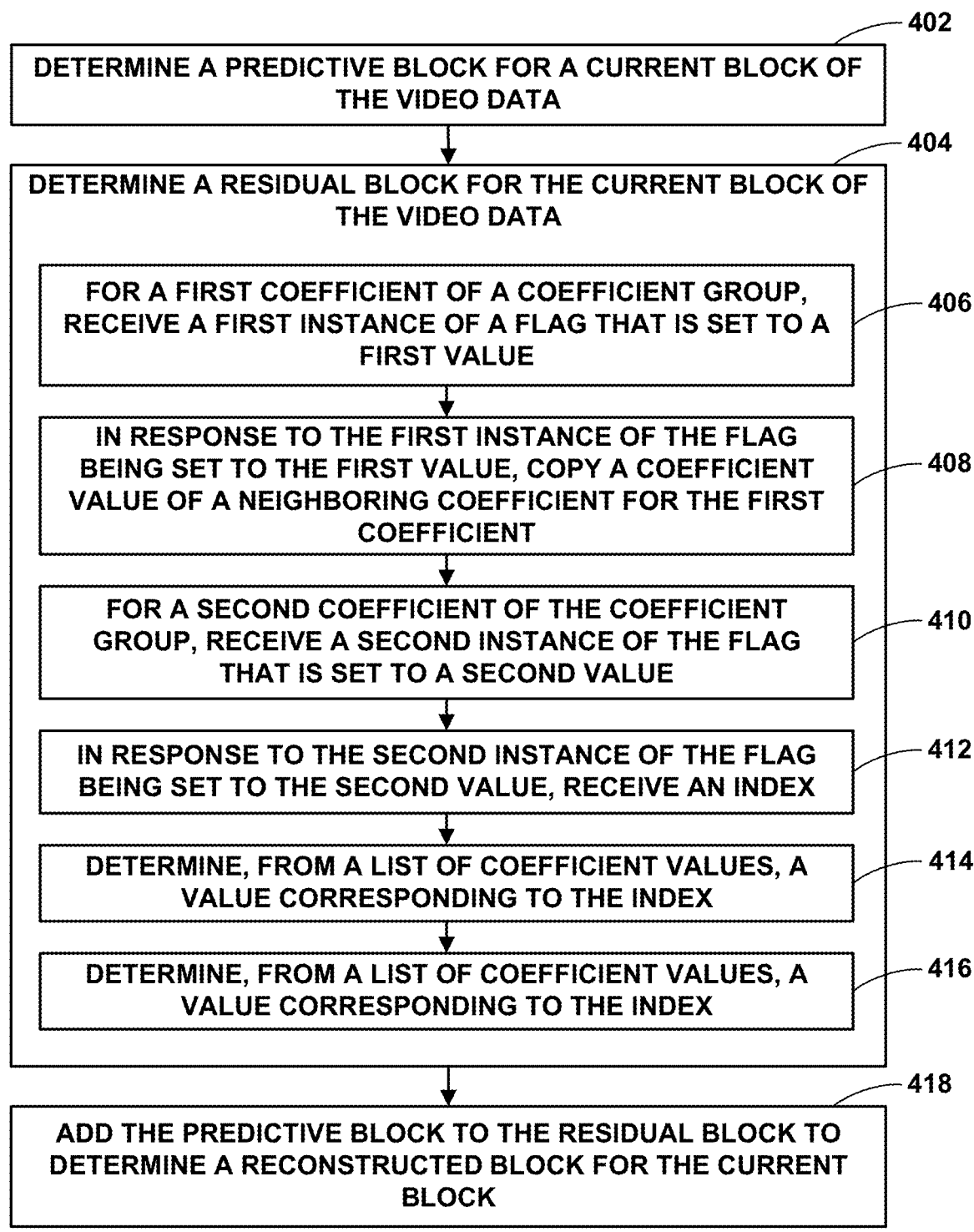
FIG. 10 is a flowchart illustrating a video decoding process.

FIG. 10 is a flowchart illustrating an example process for decoding video data. Although described with respect to video decoder 300 (FIGS. 1 and 7), it should be understood that other devices may be configured to perform a process similar to that of FIG. 10. Video decoder 300 determines a predictive block for a current block of the video data (402).

Video decoder 300 determines a residual block for the current block (404). The residual block may, for example, be a coefficient group or a transform unit that includes multiple coefficient groups. In some examples, video decoder 300 may determine the residual block in the manner described for step 404 for a block that is coded in a transform skip mode.

As part of determining the residual block for the current block, video decoder 300 receives, for a first coefficient of a coefficient group, a first instance of a flag that is set to a first value (406). In response to the first instance of the flag being set to the first value, video decoder 300 copies a coefficient value of a neighboring coefficient for the first coefficient (408). In this regard, video decoder 300 "copies" the coefficient value of the neighboring coefficient by setting a value for the first coefficient equal to the coefficient value of the neighboring coefficient.

For a second coefficient of the coefficient group, video decoder 300 receives a second instance of the flag that is set to a second value (410). In response to the second instance of the flag being set to the second value, video decoder 300 receives an index (412). The index may be referred to as a first index to distinguish from subsequently received indexes. Video decoder 300 determines, from the list of coefficient values, a value corresponding to the index (414). Video decoder 300 sets a value for the second coefficient to the value corresponding to the index (416).

After, or partially in parallel with, determining the residual block, video decoder 300 adds the predictive block to the residual block to determine a reconstructed block for the current block (418). Video decoder 300 may, for example, output the reconstructed block as part of decoded video. Video decoder 300 may output the video by displaying a picture with the reconstructed block, storing a picture with the reconstructed block for later display, and/or storing a picture with the reconstructed block for use in later decoding operations. In some examples, video decoder 300 may also perform one or more filtering operations on the reconstructed block and output a filtered version of the reconstructed block.

To determine the residual block for the current block, video decoder 300 may also, for a third coefficient of the coefficient group, receive a third instance of the flag, wherein the third instance of the flag is set to the second value; in response to the third instance of the flag being set to the second value, receive a second index into the list of coefficient values; determine that a value for the third coefficient is a value not included in the list of coefficient values based on the received second index; update the list of coefficient values to include the value for the third coefficient; for a fourth coefficient of the coefficient group, receive a fourth instance of the flag, wherein the fourth instance of the flag is set to the second value; in response to the fourth instance of the flag being set to the second value, receive an index corresponding to the value for the third coefficient in the list of coefficient values; and set a value for the fourth coefficient to the value for the third coefficient.

Figure 11:
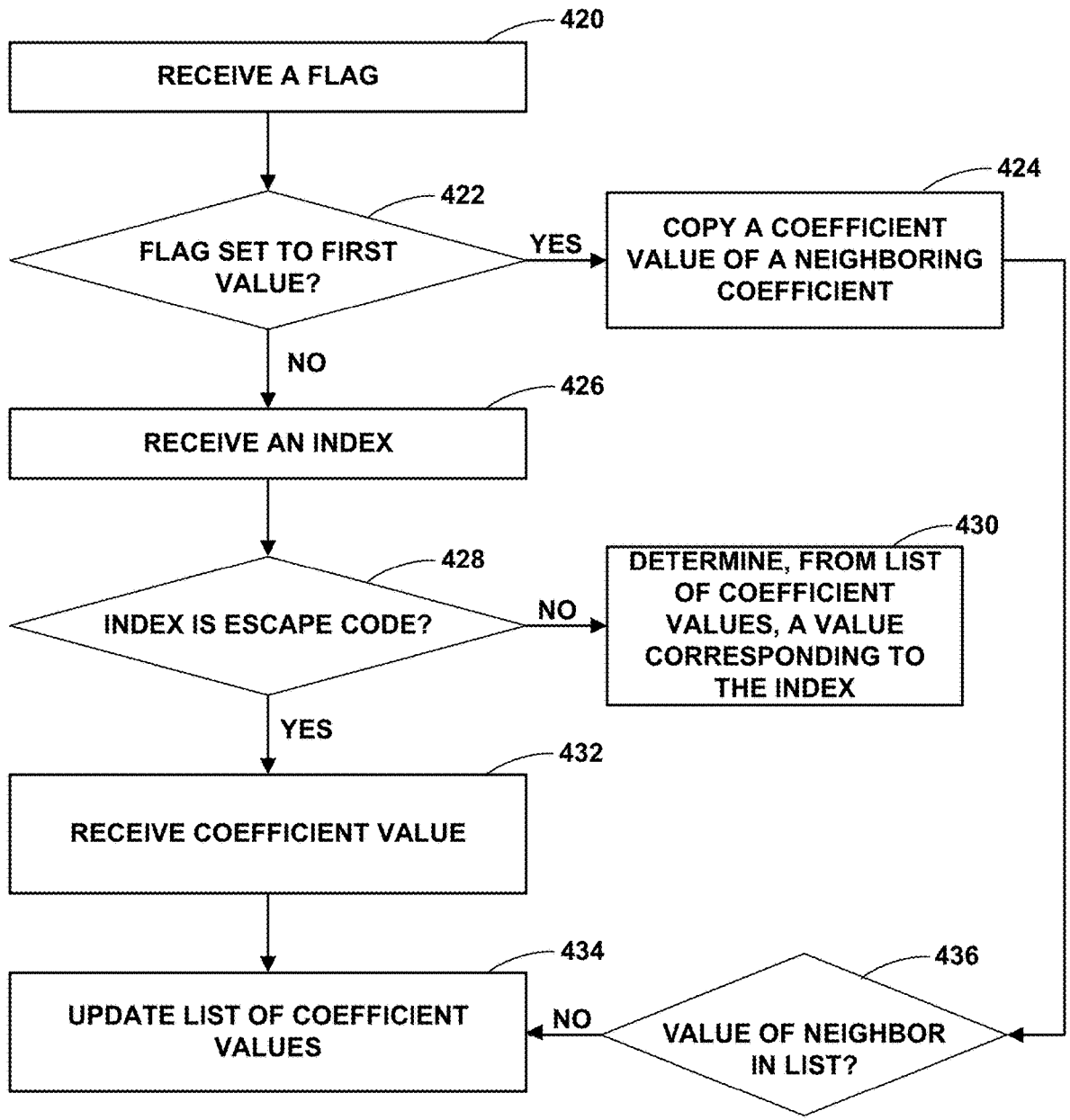
FIG. 11 is a flowchart illustrating a video decoding process.

FIG. 11 is a flowchart illustrating an example process for determining a residual block of video data. The residual block of video data may, for example, be a coefficient group or a transform unit that includes multiple coefficient groups. Although described with respect to video decoder 300 (FIGS. 1 and 7), it should be understood that other devices may be configured to perform a process similar to that of FIG. 11.

For a coefficient of the residual block, video decoder 300 receives a flag (420). If the flag is set to a first value (422, yes), the video decoder 300 sets a value for the coefficient to be equal to the value of a neighboring coefficient (424). If the flag is set to a second value (422, no), the video decoder 300 receives an index into a list of coefficient values (426). If the index is not an escape code (428, no), then video decoder 300 determines, from the list of coefficient values, a value corresponding to the index (430). Video decoder 300 sets a value for the coefficient to the value corresponding to the index. If the index is an escape code (428, yes), then video decoder 300 receives a coefficient value (432). Video decoder 300 sets a value for the coefficient to the received coefficient value. Video decoder 300 also updates the list of coefficient values to include the received coefficient value (434). In instances where the value of a neighboring coefficient is copied (424) and the value of the neighbor is not in the list of coefficient values (436, no), video decoder 300 may also update the list of coefficient values to include the value of neighbor (434).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a predictive block for a current block of the video data;
   determining a residual block for the current block, wherein determining the residual block for the current block comprises determining a coefficient group including a first coefficient, a second coefficient, and a neighboring coefficient of the first coefficient, comprising:
- for the first coefficient of the coefficient group, receiving a first instance of a flag, wherein the first instance of the flag is set to a first value;
- in response to the first instance of the flag being set to the first value, copying a coefficient value of the neighboring coefficient for the first coefficient;
- for the second coefficient of the coefficient group, receiving a second instance of the flag, wherein the second instance of the flag is set to a second value;
- in response to the second instance of the flag being set to the second value, receiving an index into a list of coefficient values;
- determining, from the list of coefficient values, a value corresponding to the index; and
- setting a value for the second coefficient to the value corresponding to the index; and
- adding the predictive block to the residual block to determine a reconstructed block for the current block.

2. The method of claim 1, wherein determining the residual block for the current block further comprises:
- determining a scan order for the coefficient group; and
- determining the neighboring coefficient based on the determined scan order.

3. The method of claim 2, wherein the scan order for the coefficient group comprises a horizontal scan order and the neighboring coefficient comprises a left neighbor.

4. The method of claim 2, wherein the scan order for the coefficient group comprises a vertical scan order and the neighboring coefficient comprises a top neighbor.

5. The method of claim 1, wherein the list of coefficient values comprises a set of fixed coefficient values.

6. The method of claim 1, wherein the index comprises a first index, and wherein determining the residual block for the current block further comprises:
- for a third coefficient of the coefficient group, receiving a third instance of the flag, wherein the third instance of the flag is set to the second value;
- in response to the third instance of the flag being set to the second value, receiving a second index into the list of coefficient values;
- determining that a value for the third coefficient is a value not included in the list of coefficient values based on the received second index;
- updating the list of coefficient values to include the value for the third coefficient;
- for a fourth coefficient of the coefficient group, receiving a fourth instance of the flag, wherein the fourth instance of the flag is set to the second value;
- in response to the fourth instance of the flag being set to the second value, receiving an index corresponding to the value for the third coefficient in the list of coefficient values; and
- setting a value for the fourth coefficient to the value for the third coefficient.

7. The method of claim 1, wherein determining the residual block is performed in response to determining that the current block is encoded using a transform skip mode.

8. The method of claim 1, wherein receiving the index comprises:
- receiving a truncated unary code; and
- determining the index from the truncated unary code.

9. The method of claim 1, further comprising:
- performing one or more filtering operations on the reconstructed block.

10. The method of claim 1, wherein the residual block comprises a transform unit.

11. A device for decoding video data, the device comprising:
- a memory configured to store video data; and
- one or more processors implemented in circuitry and configured to:
  - determine a predictive block for a current block of the video data;
  - determine a residual block for the current block, wherein to determine the residual block for the current block, the one or more processors are further configured to determine a coefficient group including a first coefficient, a second coefficient, and a neighboring coefficient of the first coefficient and wherein to determine the coefficient group the one or more processors is further configured to:
    - for the first coefficient of the coefficient group, receive a first instance of a flag, wherein the first instance of the flag is set to a first value;
    - in response to the first instance of the flag being set to the first value, copy a coefficient value of the neighboring coefficient for the first coefficient;
    - for the second coefficient of the coefficient group, receive a second instance of the flag, wherein the second instance of the flag is set to a second value;
    - in response to the second instance of the flag being set to the second value, receive an index into a list of coefficient values;
    - determine, from the list of coefficient values, a value corresponding to the index; and
    - set a value for the second coefficient to the value corresponding to the index; and
  - add the predictive block to the residual block to determine a reconstructed block for the current block.

12. The device of claim 11, wherein to determine the residual block for the current block, the one or more processors are further configured to:
- determine a scan order for the coefficient group; and
- determine the neighboring coefficient based on the determined scan order.

13. The device of claim 12, wherein the scan order for the coefficient group comprises a horizontal scan order and the neighboring coefficient comprises a left neighbor.

14. The device of claim 12, wherein the scan order for the coefficient group comprises a vertical scan order and the neighboring coefficient comprises a top neighbor.

15. The device of claim 11, wherein the list of coefficient values comprises a set of fixed coefficient values.

16. The device of claim 11, wherein the index comprises a first index, and wherein to determine the residual block for the current block, the one or more processors are further configured to:
- for a third coefficient of the coefficient group, receive a third instance of the flag, wherein the third instance of the flag is set to the second value;
- in response to the third instance of the flag being set to the second value, receive a second index into the list of coefficient values;
- determine that a value for the third coefficient is a value not included in the list of coefficient values based on the received second index;
- update the list of coefficient values to include the value for the third coefficient;
- for a fourth coefficient of the coefficient group, receive a fourth instance of the flag, wherein the fourth instance of the flag is set to the second value;

in response to the fourth instance of the flag being set to the second value, receive an index corresponding to the value for the third coefficient in the list of coefficient values; and set a value for the fourth coefficient to the value for the third coefficient.

17. The device of claim 11, wherein the one or more processors are further configured to determine the residual block in response to determining that the current block is encoded using a transform skip mode.

18. The device of claim 11, wherein the one or more processors are further configured to:

perform one or more filtering operations on the reconstructed block.

19. The device of claim 11, wherein the residual block comprises a transform unit.

20. The device of claim 11, wherein to receive the index, the one or more processors are further configured to:

receive a truncated unary code; and determine the index from the truncated unary code.

21. The device of claim 11, wherein the device comprises a wireless communication device, further comprising a receiver configured to receive encoded video data.

22. The device of claim 21, wherein the wireless communication device comprises a telephone handset and wherein the receiver is configured to demodulate, according to a wireless communication standard, a signal comprising the encoded video data.

23. The device of claim 11, further comprising:

a display configured to display decoded video data.

24. The device of claim 11, further comprising:

one or more of a camera, a computer, a mobile device, a broadcast receiver device, or a set-top box.

25. A non-transitory computer-readable medium storing instructions that when executed by one or more processors cause the one or more processors to:

determine a predictive block for a current block of video data;

determine a residual block for the current block, wherein to determine the residual block for the current block, the instructions cause the one or more processors to determine a coefficient group including a first coefficient, a second coefficient, and a neighboring coefficient of the first coefficient, wherein to determine the coefficient group, the instructions cause the one or more processors to:

for the first coefficient of the coefficient group, receive a first instance of a flag, wherein the first instance of the flag is set to a first value;

in response to the first instance of the flag being set to the first value, copy a coefficient value of the neighboring coefficient for the first coefficient;

for the second coefficient of the coefficient group, receive a second instance of the flag, wherein the second instance of the flag is set to a second value;

in response to the second instance of the flag being set to the second value, receive an index into a list of coefficient values;

determine, from the list of coefficient values, a value corresponding to the index; and set a value for the second coefficient to the value corresponding to the index; and add the predictive block to the residual block to determine a reconstructed block for the current block.

26. The computer-readable medium of claim 25, wherein to determine the residual block for the current block, the instructions cause the one or more processors to:

determine a scan order for the coefficient group; and determine the neighboring coefficient based on the determined scan order.

27. The computer-readable medium of claim 26, wherein the scan order for the coefficient group comprises a horizontal scan order and the neighboring coefficient comprises a left neighbor.

28. The computer-readable medium of claim 26, wherein the scan order for the coefficient group comprises a vertical scan order and the neighboring coefficient comprises a top neighbor.

29. The computer-readable medium of claim 25, wherein the list of coefficient values comprises a set of fixed coefficient values.

30. The computer-readable medium of claim 25, wherein the index comprises a first index, and wherein to determine the residual block for the current block, the instructions cause the one or more processors to:

for a third coefficient of the coefficient group, receive a third instance of the flag, wherein the third instance of the flag is set to the second value;

in response to the third instance of the flag being set to the second value, receive a second index into the list of coefficient values;

determine that a value for the third coefficient is a value not included in the list of coefficient values based on the received second index;

update the list of coefficient values to include the value for the third coefficient;

for a fourth coefficient of the coefficient group, receive a fourth instance of the flag, wherein the fourth instance of the flag is set to the second value;

in response to the fourth instance of the flag being set to the second value, receive an index corresponding to the value for the third coefficient in the list of coefficient values; and set a value for the fourth coefficient to the value for the third coefficient.

31. The computer-readable medium of claim 25, wherein the instructions cause the one or more processors to determine residual block in response to determining that the current block is encoded using a transform skip mode.

32. The computer-readable medium of claim 25, storing additional instructions that when executed by the one or more processors cause the one or more processors to:

perform one or more filtering operations on the reconstructed block.

33. The computer-readable medium of claim 25, wherein the residual block comprises a transform unit.

34. The computer-readable medium of claim 25, wherein to receive the index, the instructions cause the one or more processors to:

receive a truncated unary code; and determine the index from the truncated unary code.

35. An apparatus comprising:

means for determining a predictive block for a current block of video data;

means for determining a residual block for the current block, wherein the means for determining the residual block for the current block comprises means for determining a coefficient group including a first coefficient, a second coefficient, and a neighboring coefficient of the first coefficient, the means for determining the coefficient group comprising:

means for receiving a first instance of a flag for the first coefficient of the coefficient group, wherein the first instance of the flag is set to a first value;

means for copying a coefficient value of the neighboring coefficient for the first coefficient in response to the first instance of the flag being set to the first value;

means for receiving a second instance of the flag for the second coefficient of the coefficient group, wherein the second instance of the flag is set to a second value;

means for receiving an index in response to the second instance of the flag being set to the second value into a list of coefficient values;

means for determining, from the list of coefficient values, a value corresponding to the index;

means for setting a value for the second coefficient to the value corresponding to the index;

means for adding the predictive block to the residual block to determine a reconstructed block for the current block.

36. The apparatus of claim 35, wherein the means for determining the residual block for the current block further comprises:

means for determining a scan order for the coefficient group; and means for determining the neighboring coefficient based on the determined scan order.

37. The apparatus of claim 36, wherein the scan order for the coefficient group comprises a horizontal scan order and the neighboring coefficient comprises a left neighbor.

38. The apparatus of claim 36, wherein the scan order for the coefficient group comprises a vertical scan order and the neighboring coefficient comprises a top neighbor.

39. The apparatus of claim 35, wherein the list of coefficient values comprises a set of fixed coefficient values.

40. The apparatus of claim 35, wherein the index comprises a first index, and wherein the means for determining the residual block for the current block further comprises:

means for receiving, for a third coefficient of the coefficient group, a third instance of the flag, wherein the third instance of the flag is set to the second value;

means for receiving a second index into the list of coefficient values in response to the third instance of the flag being set to the second value;

means for determining that a value for the third coefficient is a value not included in the list of coefficient values based on the received second index;

means for updating the list of coefficient values to include the value for the third coefficient;

means for receiving, for a fourth coefficient of the coefficient group, a fourth instance of the flag, wherein the fourth instance of the flag is set to the second value;

means for receiving an index corresponding to the value for the third coefficient in the list of coefficient values in response to the fourth instance of the flag being set to the second value; and means for setting a value for the fourth coefficient to the value for the third coefficient.

41. The apparatus of claim 35, wherein the means for determining the residual block determines the residual block in response to determining that the current block is encoded using a transform skip mode.

42. The apparatus of claim 35, further comprising:

means for performing one or more filtering operations on the reconstructed block.

43. The apparatus of claim 35, wherein the residual block comprises a transform unit.

44. The apparatus of claim 35, wherein the means for receiving the index comprises:

means for receiving a truncated unary code; and means for determining the index from the truncated unary code.

* * * * *